(12) United States Patent
Chae

(10) Patent No.: US 10,991,115 B2
(45) Date of Patent: Apr. 27, 2021

(54) IMAGE PROCESSING DEVICE, IMAGE PROCESSING METHOD, SERVER, AND COMPUTER PROGRAM

(71) Applicant: Rakuten, Inc., Tokyo (JP)

(72) Inventor: Yeongnam Chae, Tokyo (JP)

(73) Assignee: Rakuten, Inc., Tokyo (JP)

(*) Notice: Subject to any disclaimer, the term of this patent is extended or adjusted under 35 U.S.C. 154(b) by 20 days.

(21) Appl. No.: 16/471,111

(22) PCT Filed: Mar. 6, 2017

(86) PCT No.: PCT/JP2017/008750
§ 371 (c)(1),
(2) Date: Jun. 19, 2019

(87) PCT Pub. No.: WO2018/163238
PCT Pub. Date: Sep. 13, 2018

(65) Prior Publication Data
US 2020/0020122 A1    Jan. 16, 2020

(51) Int. Cl.
*G06T 7/60* (2017.01)
*G06T 7/11* (2017.01)
*G06T 7/90* (2017.01)

(52) U.S. Cl.
CPC ............ *G06T 7/60* (2013.01); *G06T 7/11* (2017.01); *G06T 7/90* (2017.01); *G06T 2207/10024* (2013.01); *G06T 2207/30124* (2013.01)

(58) Field of Classification Search
CPC ..... G06T 7/60; G06T 7/11; G06T 7/90; G06T 2207/10024; G06T 2207/30124; G06T 2207/30196
See application file for complete search history.

(56) References Cited

U.S. PATENT DOCUMENTS

| 5,315,666 A * | 5/1994 | Norton-Wayne .... G01B 11/024 382/111 |
| 9,349,076 B1 * | 5/2016 | Liu .................... G06K 9/00369 |

(Continued)

FOREIGN PATENT DOCUMENTS

| JP | 07-160883 A | 6/1995 |
| JP | 2010-159887 A | 7/2010 |

(Continued)

OTHER PUBLICATIONS

Kalantidis et al., Getting the Look: Clothing Recognition and Segmentation for Automatic Product Suggestions in Everyday Photos (Year: 2013).*

(Continued)

*Primary Examiner* — John B Strege
(74) *Attorney, Agent, or Firm* — Sughrue Mion, PLLC

(57) ABSTRACT

A technology is required in which clothing can be accurately classified, regardless of a posture of a subject. An image processing device, includes: an acquisition means for acquiring an image to be processed including an image of clothing worn by a subject on a lower body; a specifying means for specifying a position of an end portion of the clothing, in the image to be processed; an extraction means for extracting a connected region which is positioned to be adjacent to the end portion of the clothing and is configured by connecting prescribed pixels, from the image to be processed; and a determination means for determining a type of the clothing, on the basis of the connected region.

13 Claims, 10 Drawing Sheets

(56) References Cited

U.S. PATENT DOCUMENTS

| | | | | |
|---|---|---|---|---|
| 9,513,788 | B2* | 12/2016 | Suzuki | G06Q 30/0643 |
| 10,176,636 | B1* | 1/2019 | Neustein | G06T 7/246 |
| 2006/0251338 | A1* | 11/2006 | Gokturk | G06F 16/583 |
| | | | | 382/305 |
| 2010/0111370 | A1* | 5/2010 | Black | G06K 9/00369 |
| | | | | 382/111 |
| 2011/0274314 | A1* | 11/2011 | Yang | G06T 7/187 |
| | | | | 382/103 |
| 2012/0051651 | A1* | 3/2012 | Yamaoka | G06K 9/468 |
| | | | | 382/195 |
| 2013/0033591 | A1* | 2/2013 | Takahashi | G06K 9/50 |
| | | | | 348/77 |
| 2013/0044944 | A1* | 2/2013 | Wang | G06F 16/5838 |
| | | | | 382/165 |
| 2013/0142423 | A1* | 6/2013 | Zhang | G06K 9/6256 |
| | | | | 382/159 |
| 2015/0254514 | A1* | 9/2015 | Oami | G06K 9/00771 |
| | | | | 707/722 |
| 2016/0071321 | A1* | 3/2016 | Nishiyama | G06T 19/00 |
| | | | | 345/632 |
| 2017/0124420 | A1* | 5/2017 | Zhao | G06K 9/48 |

FOREIGN PATENT DOCUMENTS

| | | |
|---|---|---|
| JP | 2010-262425 A | 11/2010 |
| JP | 2011-180674 A | 9/2011 |

OTHER PUBLICATIONS

Yang et al., Real-time clothing recognition in surveillance videos (Year: 2011).*

Japanese Office Action issued in JP 2018-536526 dated Oct. 16, 2018.

International Search Report of PCT/JP2017/008750 dated May 23, 2017.

* cited by examiner

CUT PORTION AS TOP OF FEET, ON BASIS OF ANKLE

RECTANGULAR REGION

IMAGE PROCESSING DEVICE, IMAGE PROCESSING METHOD, SERVER, AND COMPUTER PROGRAM

CROSS REFERENCE TO RELATED APPLICATIONS

This application is a National Stage of International Application No. PCT/JP2017/008750 filed Mar. 6, 2017.

TECHNICAL FIELD

The present invention relates to an image processing device, an image processing method, a server, and a computer program.

BACKGROUND ART

A technology has been proposed in which an image obtained by photographing a subject wearing clothing, is analyzed, and the clothing worn by the subject is classified (refer to Patent Document 1).

Patent Document 1: Japanese Unexamined Patent Application, Publication No. 2010-262425

DISCLOSURE OF THE INVENTION

Problems to be Solved by the Invention

However, in the proposed technology, the posture of the subject in the image to be analyzed, is uniform, and thus, in a case where the appearance of the clothing is changed according to a change in the posture of the subject, it is not possible to accurately classify the clothing.

Therefore, a technology is required in which it is possible to accurately classify the clothing, regardless of the posture of the subject.

Means for Solving the Problems

An image processing device corresponding to one of embodiments of the present invention for solving the problems described above, includes:
an acquisition means for acquiring an image to be processed including an image of clothing worn by a subject on a lower body;
a specifying means for specifying a position of an end portion of the clothing, in the image to be processed;
an extraction means for extracting a connected region which is positioned to be adjacent to the end portion of the clothing and is configured by connecting prescribed pixels, from the image to be processed; and
a determination means for determining a type of the clothing, on the basis of the connected region.

Effects of the Invention

According to the present invention, it is possible to accurately classify clothing, regardless of a posture of a subject.

PREFERRED MODE FOR CARRYING OUT THE INVENTION

Hereinafter, embodiments according to the present invention will be described with reference to the drawings. Furthermore, the embodiments described below are an example, and the present invention is not limited thereto. For this reason, other configurations may be included insofar as characteristic configurations of the present invention can be applied.

Embodiment 1

Hereinafter, a first embodiment of the present invention will be described with reference to the attached drawings. Here, constituents described in the embodiment are merely illustrative, and the scope of the present invention is not limited thereto.

Configuration of Image Processing Device

The outline of the image processing device corresponding to Embodiment 1, will be described. In Embodiment 1, a case of executing image processing corresponding to this embodiment in a single device, will be described.

The image processing device corresponding to Embodiment 1, for example, can be configured as a personal computer. In a case where the image processing device is configured as the personal computer, processing of analyzing an input image, and of determining the type of clothing included in the image, is executed. In addition, the image processing device may be configured as a device having an imaging function, and in this case, for example, can be configured as a digital camera, a digital video camera, a smart phone, and a tablet terminal. In addition, the image processing device may be configured as a laptop computer with a camera.

Figure 1:
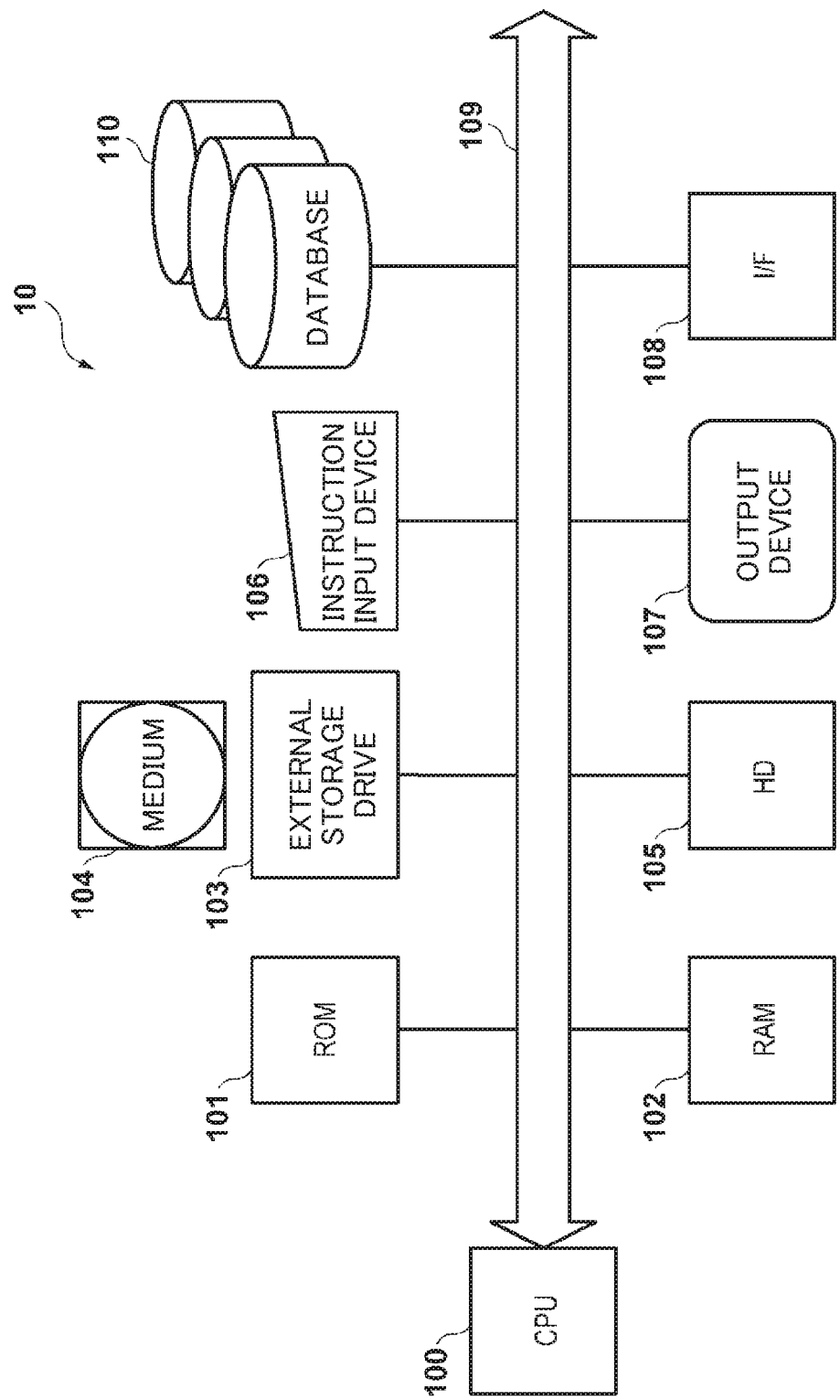
FIG. 1 is a diagram illustrating a configuration example of an image processing device, corresponding to an embodiment of the present invention.

Hereinafter, an image processing device 10 corresponding to this embodiment will be described with reference to FIG. 1, and FIG. 1 illustrates an example in which the image processing device 10 is configured as a personal computer. Even though it is not illustrated in FIG. 1, in a case where the image processing device 10 is configured as a digital camera or the like, the image processing device 10 can be configured to have an imaging function for inputting an image, for example, to include an imaging sensor unit.

In FIG. 1, a CPU 100 performs control of executing an application program stored in a hard disk device (hereinafter, referred to as an HD) 105 (including an application program for executing the image processing corresponding to this embodiment), an operating system (OS), a control program, or the like, and of temporarily storing information, a file, or the like, necessary for executing the program, in a RAM 102. The CPU 100 controls data transmission and reception with respect to an external device through an interface 108, executes analysis processing of the data received from the external device, and generates data to be transmitted to the external device (including a processing request or a data request).

A ROM 101 stores various data items such as a basic I/O program, and the application program for executing the image processing corresponding to this embodiment. The RAM 102 temporarily stores various data items, and functions as a main memory, a work area, or the like of the CPU 100.

An external storage drive 103 is an external storage drive for realizing access with respect to a recording medium, and is capable of loading a program or the like stored in a medium (the recording medium) 104, in this computer system. Furthermore, for example, a Floppy (Registered Trademark) disk (FD), a CD-ROM, a CD-R, a CD-RW, a PC card, a DVD, Blu-ray (Registered Trademark), an IC memory card, an MO, a memory stick, and the like can be used as the medium 104.

In this embodiment, a hard disk (HD) functioning as a large-capacity memory, is used as the external storage device 105. In an HD 105, an application program, an OS, a control program, an associated program, and the like are stored. Furthermore, a non-volatile storage device such as a Flash (Registered Trademark) memory may be used instead of the hard disk.

An instruction input device 106 corresponds to a keyboard or a pointing device (a mouse or the like), a touch panel, and the like. An output device 107 outputs a command input from the instruction input device 106, response output of the image processing device 10 with respect to the command, and the like. The output device 107 includes a display, a speaker, a headphone terminal, and the like. A system bus 109 controls a flow of data in the image processing device.

An interface (hereinafter, referred to as an I/F) 108 functions as a transmission device, a reception device, or a communication device, which intermediates data exchange with respect to the external device. Specifically, the I/F 108 is capable of including a wireless communication module, and the module is capable of including a known circuit mechanism such as an antenna system, an RF transceiver, one or more amplifiers, a tuner, one or more oscillators, a digital signal processor, a CODEC chipset, a subscriber identification module card, and a memory. In addition, the I/F 108 is capable of including a wired communication module for wired connection. The wired communication module is capable of communicating with the other device through one or more external ports. In addition, the I/F 108 is capable of including various software components processing the data. The external port is directly combined with the other device, or is indirectly combined with the other device through the Ethernet, a USB, IEEE1394, or the like, or a network. Furthermore, software of realizing the same function as that of each of the devices described above, can be configured instead of a hardware device.

A database 110 is connected to the system bus 109, and stores and manages prescribed data under the control of the CPU 100. The prescribed data includes a processed image associated with a determination result of the type of the clothing.

Whenever the corresponding program for executing the processing corresponding to the embodiment, is operated, the program may be loaded in the RAM 102 from the HD 105 in which the program is installed in advance. In addition, a program according to this embodiment, is recorded in the ROM 101, and is configured to form a part of a memory map, and thus, the program can be directly executed by the CPU 100. Further, the corresponding program or the associated data can be executed by being directly loaded in the RAM 102 from the medium 104.

Determination Processing of Type of Clothing

Next, an image processing method to be executed by the image processing device 10 corresponding to the embodiment, will be described. In the image processing method corresponding to this embodiment, processing of determining the type (also referred to as a style) of the clothing reflected on the image from an image to be processed, is performed. The type of the clothing includes the type of style based on the length of the sleeve or the pants of the clothing, in addition to the type of clothing worn on an upper body and the type of clothing worn on a lower body. In this embodiment, the case of determining a difference in the types (the styles) based on the length of the pants of the clothing worn on the lower body, will be described. In addition, in this embodiment, pants will be particularly described, but the embodiment may be applied to a skirt. In the pants, pants having a length of completely covering the ankle is referred to as a "full-length pants" or "long pants", pants shorter than "full-length pants" or "long pants" are generally referred to as "capri pants" or "cropped pants", pants of a knee-length, which are shorter than "capri pants" or "cropped pants", are referred to as "half pants", and pants shorter than "half pants" are referred to as "short pants".

In the case of an image obtained by photographing pants worn by a subject, there is a case where the pants are not directed towards the front side, according to the pose of the subject. In particular, in the case of the pants, there is a case where the subject is photographed in a state of being directed towards an inclination direction, and thus, there is a case where it is difficult to accurately determine the type of the pants on the basis of only the shape. Accordingly, in this embodiment, a method will be described in which the type of pants can be determined with a high accuracy, without being affected by the posture of the subject.

Figure 2:
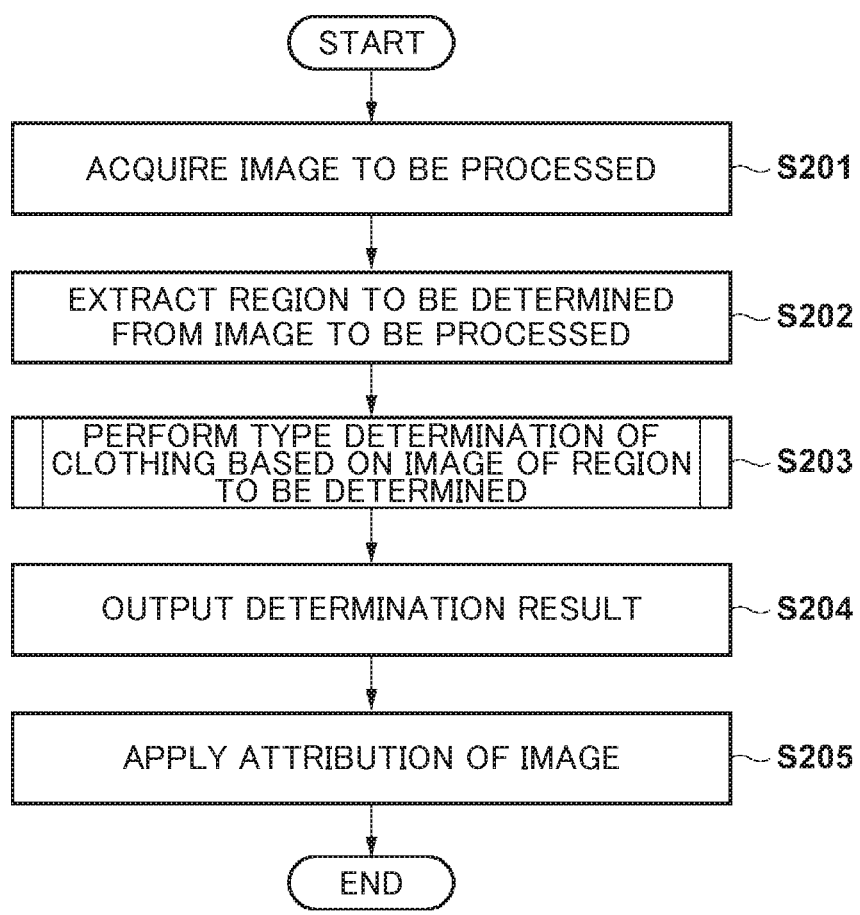
FIG. 2 is a flowchart illustrating an example of a flow of image processing, corresponding to the embodiment of the present invention.

FIG. 2 is a flowchart of processing of the type of pants, corresponding to this embodiment. Hereinafter, for the sake of simple description, the case of classifying three types of "long pants", "capri pants", and "cropped pants", will be described. Here, "half pants" or "short pants" can also be classified by the same method. The processing corresponding to the flowchart, for example, can be realized by allowing the CPU 100 to execute the corresponding program (stored in the ROM 101, the HD 105, or the like), and to control an operation of each functional block.

Figure 6:
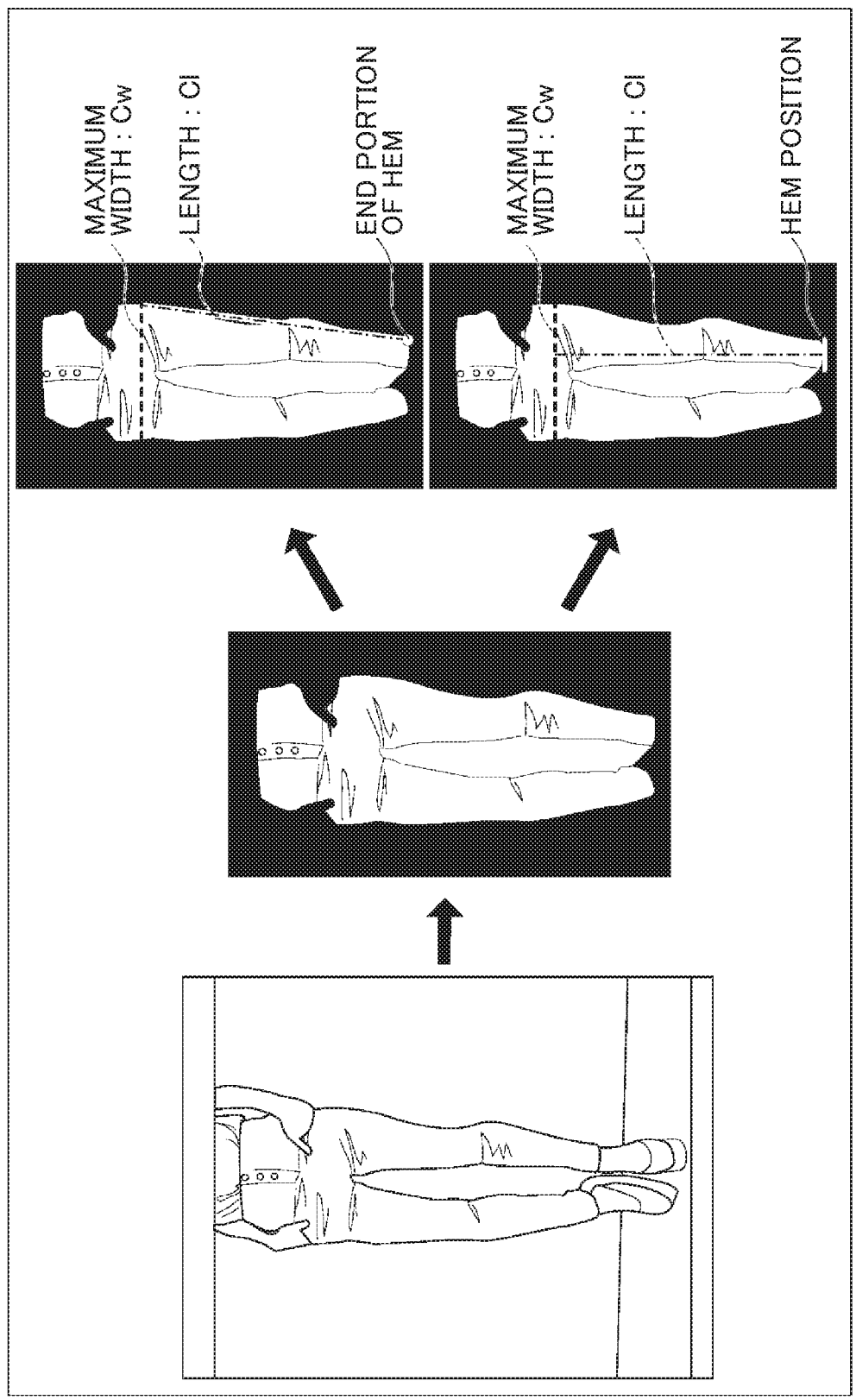
FIG. 6 is a diagram for illustrating calculation processing of a maximum width and a length of pants, corresponding to the embodiment of the present invention.

First, in S201, the CPU 100 acquires the image to be processed. The image may be an image stored in the medium 104 or the HD 105, and in a case where the image processing device 10 includes the imaging sensor unit, an image generated by being photographed with the imaging sensor unit, may be input. The resolution of the image acquired in S201 is not particularly limited. In addition, for example, in a state where a model who is the subject, wears clothing, an image may be obtained by photographing at least the lower body to be in a field angle, as a photographing condition of the image. Examples of the image include an image as illustrated in FIG. 6 described below.

Subsequently, in S202, the CPU 100 extracts a region in which the type of the clothing is determined, in the acquired image to be processed. In this embodiment, in the image to be processed, a clothing region on which the pants are reflected, and a skin color region on which feet of the subject, extending downward from the hem of the pants are reflected, can be respectively extracted as a region to be determined. For example, in the image to be processed, the clothing region and the skin color region may be respectively extracted as a segment, on the basis of difference information with respect to a prescribed background, and both of the regions may be extracted as the region to be determined. Alternatively, the clothing region and the skin color region may be each independently extracted as the region to be determined. Further, a user of the image processing device 10 may designate the region to be determined. In this case, an outline of the entire clothing may be designated, or a part of a region of the clothing may be designated. A known technology such as a segmentation technology can be used in extraction processing itself of the region to be determined, and thus, the more detailed description will be omitted.

In addition, the region to be determined may be only the skin color region. In this embodiment, the type of the clothing can be determined on the basis of the shape of the feet of the subject, which are seen from the hem, and thus, the region to be processed may be limited in advance to a portion lower than the hem. In the extraction of the skin color region, the position of the hem which is an end portion of the pants, can be specified, a region in which pixels having a skin color value, which are positioned to be adjacent to the hem, are connected, can be extracted, and the region configured by the connected pixels can be set to the skin color region. As described below, the position of the hem can be specified on the basis of a change in an inclination in the vicinity of a tip end of the pants, which is positioned on the lower side of the image.

As described in Embodiment 2 described below, clothing type determination processing of this embodiment can be used at the time of registering a product image of clothing in a server side database. Then, in a case where pants are registered as a product, in order to increase visual quality of the product itself in the product image to be registered, it is general that the bare feet of the model who is the subject, are seen from the hem of the pants. Accordingly, in a case where such a product image is set to a processing target, the skin color region is easily extracted.

Next, in S203, the CPU 100 determines the type of the clothing, on the basis of an image of the extracted region to be determined. Subsequently, in S204, the CPU 100 outputs a determination result obtained in S203. For example, a display corresponding to the determination result can be displayed on a display of the output device 107. In S204, the determination result is output, and in S205, the CPU 100 applies the information of the type of the clothing based on the determination result, to the image to be processed, as attribution.

As described above, the information relevant to the type of the clothing included in the image to be processed, can be applied as attribution information. Hereinafter, the details of the clothing type determination processing in S203, will be described. In this embodiment, a plurality of processings of Type Determination Processings 1 to 4 can be provided as the clothing type determination processing. Hereinafter, each of the processings will be described.

Type Determination Processing 1

Figure 3:
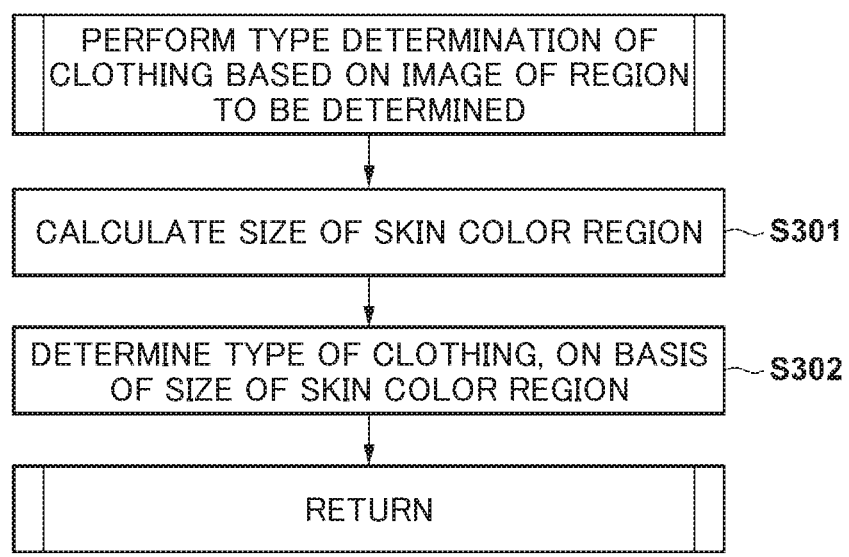
FIG. 3 is a flowchart corresponding to a first aspect of clothing type determination processing, corresponding to the embodiment of the present invention.

Type Determination Processing 1 is processing of determining the type of the clothing on the basis only of the skin color region. FIG. 3 illustrates a flowchart corresponding to an example of Type Determination Processing 1.

First, in S301, the size of the skin color region is calculated. For example, an area Hs of the region may be calculated as the size of the skin color region. Alternatively, a rectangular region surrounding the skin color region (for example, a circumscribing rectangular region) may be set, and a ratio Rh between a height Hl and a width Hw of the rectangular region may be calculated.

Subsequently, in S302, the type of the clothing is determined, on the basis of the size of the skin dolor region, calculated in S301. In the case of the pants, an exposure degree of the skin color portion is different according to the length of the pants. For example, in the case of long pants, the ankle is covered with the hem of the pants, and thus, the skin color portion is not exposed, and therefore, in a case where there is no skin color portion, it is possible to determine that the pants are long pants. In addition, in capri pants, cropped pants, half pants, and short pants, the exposure degree of the skin color portion is different according to the length of the pants, and the difference affects the size of the skin color region. The area Hs of the skin color region increases as the exposure degree of the skin color portion increases. In addition, the value or the height Hl in the rectangular region increases as the exposure degree increases, and thus, the ratio Rh=Hl/Hw of the height to the width Hw is changed. Therefore, a range in which the size of the skin color region can be obtained according to the length of the pants, is set, and the length of the pants is determined on the basis of which of the ranges, the size of the skin color region, calculated in S301, belongs to. For example, a range of the long pants is set to Rl1, a range of the capri pants is set to Rm1, and a range of the cropped pants is set to Rs1, and thus, in the case of Rh∈Rl1, the pants can be set to the long pants, in the case of Rh∈Rm1, the pants can be set to the capri pants, and in the case of Rh∈Rs1, the pants can be set to the cropped pants.

Furthermore, in the type determination processing described above, the size is calculated by using the region detected as the skin color region, but in a case where the subject wears high heels, the top of the foot is seen, and thus, there is a concern that the skin color region is detected larger than in reality. In addition, in a case where the subject is directed towards the lateral side, and the lateral side of the foot is seen, there is a concern that the skin color region is extracted differently, compared to a case where the foot is seen from the front side. Therefore, in the regions detected as the skin color region, the size of the skin color region is calculated by excluding a region having a high possibility of being exposed regardless of the length of the pants, and thus, it is possible to further increase a determination accuracy.

Examples of region to be excluded from the skin color region include a top portion of the foot, and examples of a method of excluding the top portion from the skin color region, include a method in which the position of the ankle is detected, and a region under the position of the ankle is excluded. Alternatively, a method is also exemplified in which a heel portion of the foot is detected, and a region under the heel position is excluded. For example, the outline of the foot can be extracted from the image, and the portion of the heel or the ankle can be specified as a position in which an inclination direction of the outline is changed.

Figure 4A:
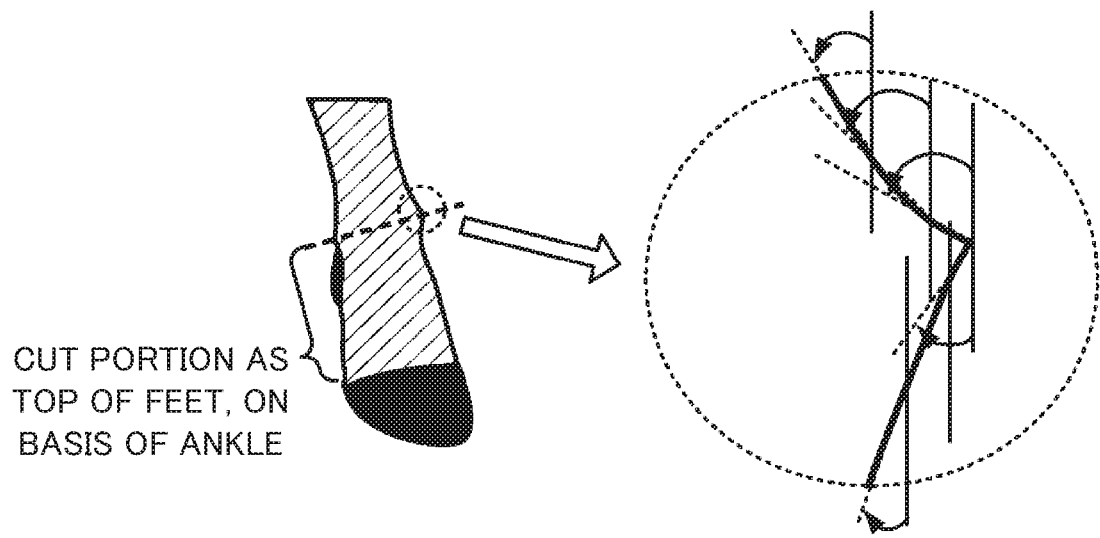
FIG. 4A is a diagram for illustrating processing with respect to a skin color region, corresponding to the embodiment of the present invention.
Figure 4B:
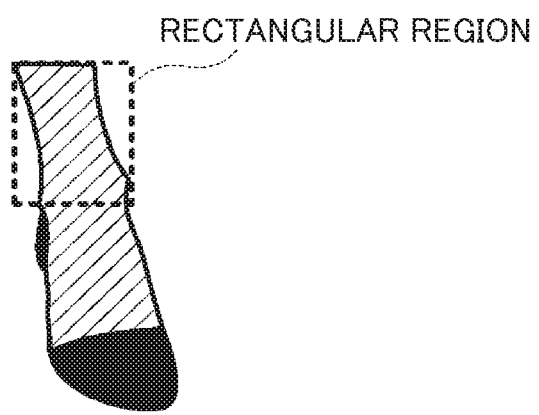
FIG. 4B is a diagram for illustrating the processing with respect to the skin color region, corresponding to the embodiment of the present invention.

FIG. 4A and FIG. 4B are diagrams illustrating a method of setting the rectangular region by excluding a part of a region from the skin color region. FIG. 4A includes an example of an image obtained by photographing feet of a female, and illustrates the skin color portion with a hatched line by surrounding the skin color portion with an outline. In an ankle on the right side illustrated in FIG. 4A, as illustrated by enlarging a region surrounded by a dotted line, an outline on the upper side from an ankle position has an inclination in an obliquely upward left direction, whereas the ankle position is changed to the boundary in an obliquely downward left direction. Such a change in the inclination occurs in an ankle position of an ankle on the left side, and an outline on the upper side from the ankle position has an inclination in an obliquely upward right direction, whereas the ankle position is changed to the boundary in an obliquely downward right direction. A region positioned on the lower side from a line segment connecting the ankle positions specified as described above, can be excluded from the skin color region, as a region positioned on the top of the foot. In addition, in a case where only one ankle position can be specified, it is possible to exclude a region positioned on the lower side from a line segment bisecting an angle of an outline in the ankle position, from the skin color region. As illustrated in FIG. 4B, a circumscribing rectangular region can be set with respect to the skin color region from which a part is excluded as described above. Furthermore, similarly, the heel can be specified on the basis of a position in which the inclination direction is changed.

Furthermore, a change in the inclination direction occurs in both of concavities and convexities of the outline. For example, an outline of the portion of "ankle" or "heel" has a convex shape of protruding to the outside, whereas a constricted portion of the ankle has an inwardly concave shape. In this embodiment, the region to be excluded from the skin color portion, is determined on the basis of the outline characteristics of the convex shape such as "ankle" or "heel".

Accordingly, for example, even in a case where the subject wears high heels, and thus, the top of the foot is included in the skin color region, it is possible to perform the determination, on the basis of the size of a region which is exposed to a position above the ankle, by excluding the top region. That is, it is possible to exclude the influence of the state of the tiptoe of the subject (for example, whether or not the subjects wears high heels or flat shoes), and to further improve the determination accuracy.

Type Determination Processing 2

Figure 5:
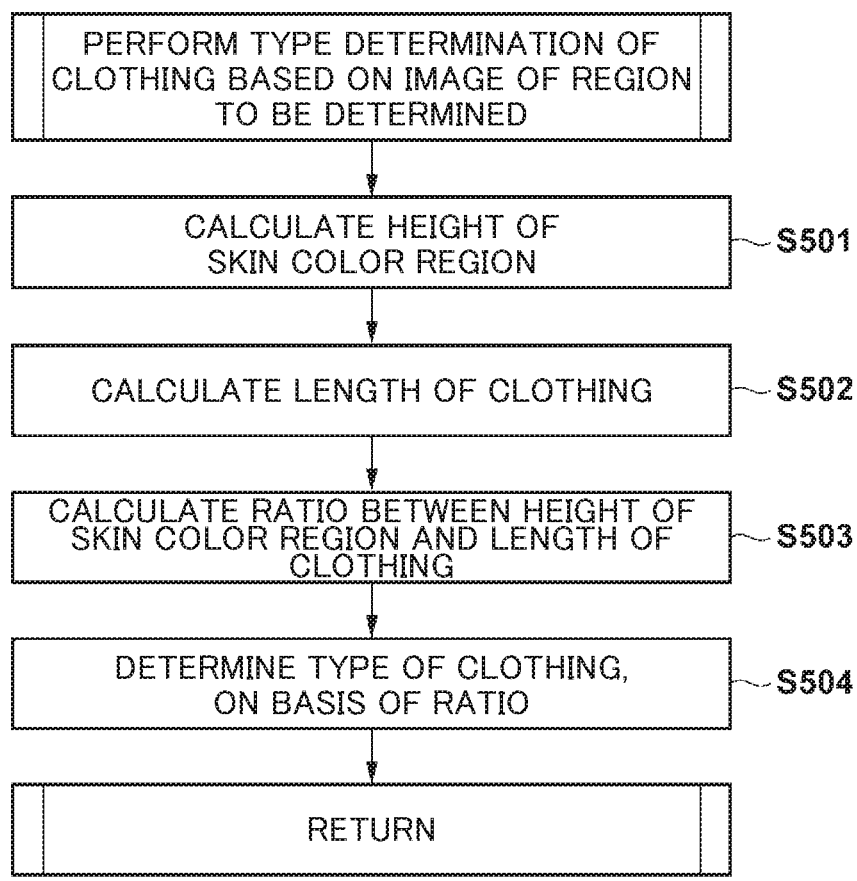
FIG. 5 is a flowchart corresponding to a second aspect of the clothing type determination processing, corresponding to the embodiment of the present invention.

Type Determination Processing 2 is processing of determining the type of the clothing, on the basis of the skin color region and the clothing region. FIG. 5 illustrates a flowchart corresponding to an example of Type Determination Processing 2.

First, in S501, the height of the skin color region is calculated. For example, the rectangular region surrounding the skin color region may be set, and the height Hl of the rectangular region may be calculated. Next, in S502, a length Cl of the clothing in the image to be processed is calculated. In the case of pants, the length of the clothing, for example, can be calculated as a length from a position with the maximum width to the hem. In S503, a ratio Rhc=Hl/Cl of the height Hl calculated in S501, to the length Cl calculated in S502 is calculated. Subsequently, in S504, the type of the clothing is determined on the basis of the size of the calculated ratio Rhc. Specifically, a range in which the ratio can be obtained according to the length of the pants as the clothing, is set, and the length of the pants is determined on the basis of which of the ranges, the ration calculated in S503 belongs to. For example, a range of the long is set to Rl2, a range of the capri pants is set to Rm2, and a range of the cropped pants is set to Rs2, and thus, in the case of Rhc∈Rl2, the pants can be set to the long pants, in the case of Rhc∈Rm2, the pants can be set to the capri pants, and in the case of Rhc∈Rs2, the pants can be set to the cropped pants. Furthermore, as with Type Determination Processing 1, the height of the skin color region is calculated by excluding a portion corresponding to the top of the foot, and thus, it is possible to exclude the influence of the state of the tiptoe of the subject, and to further increase the determination accuracy.

With reference to FIG. 6, calculation processing of the length Cl of the clothing in S502 will be described. FIG. 6 illustrates an example in which a pants portion, which is clothing of a type determination target, is extracted from the image to be processed. In a pants image extracted as described above, a portion having the largest width is set to a maximum width Cw, in intervals of adjacent outlines in a horizontal direction. In the drawing illustrated on the right end of FIG. 6, the maximum width Cw is illustrated by a dotted line. Next, in the clothing region, the position of the hem of the pants is specified. The hem of the pants is specified on the basis of a change in the inclination in the vicinity of the tip end of the pants positioned on the lower side of the image. In an end portion of the hem of the pants, an outline having an edge in the horizontal direction, configuring the lateral surface of the pants, and an outline having an edge in a vertical direction, configuring the hem, intersect with each other. An intersection between the outlines, can be specified by seeing a change in the inclination of the outline. In a case where there is a difference in the lengths of the pants on the right and left, the position of the hem of the longer side, is specified. This considers a case where the pants are obliquely photographed. In this embodiment, as illustrated on the upper right side of FIG. 6, for example, the length of the pants can be defined as a length of a line segment connecting an end portion of the maximum width, and the intersection. In addition, as illustrated on the lower right side of FIG. 6, a hem position may be specified by the outline of the hem but not by the intersection, and thus, a length (a distance) between the hem position, and a line segment defining the maximum width, may be set to the length of the pants.

Type Determination Processing 3

Figure 7:
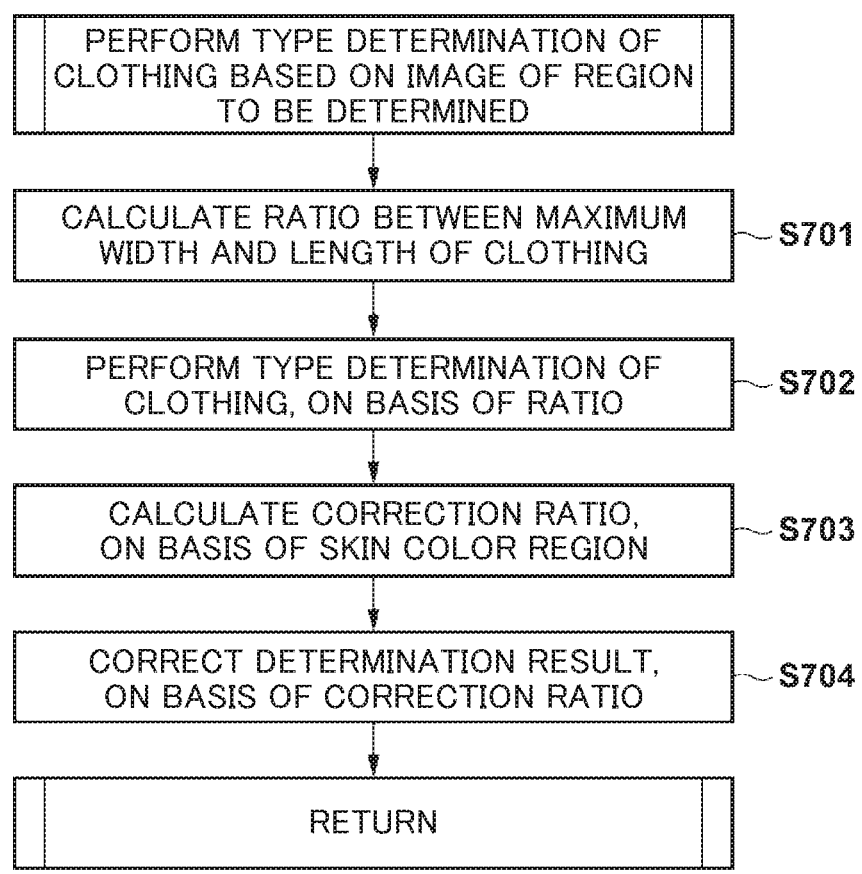
FIG. 7 is a flowchart corresponding to a third aspect of the clothing type determination processing, corresponding to the embodiment of the present invention.

Type Determination Processing 3 is processing of correcting the type of the clothing, which is determined on the basis of the clothing region, on the basis of information obtained from the skin color region. FIG. 7 illustrates a flowchart corresponding to an example of Type Determination Processing 3.

First, in S701, a ratio Rc between the maximum width Cw and the length Cl of the pants as the clothing in the image to be processed, is calculated. A calculation method of the maximum width Cw and the length Cl of the pants, is identical to that described with reference to FIG. 6. The ratio Rc=Cl/Cw is calculated with respect to the maximum width Cw and the length Cl of the pants, calculated as described above.

Next, a range in which the ratio Rc can be obtained according to the length of the pants, is set, and the length of the pants is determined on the basis of which of the ranges, the ratio calculated in S701, belongs to. For example, a range of the long pants is set to Rl3, a range of the capri pants is set to Rm3, and a range of the cropped pants is set to Rs3, and thus, in the case of Rc∈Rl3, the pants can be set to the long pants, in the case of Rc∈Rm3, the pants can be set to the capri pants, and in the case of Rc∈Rs3, the pants can be set to the cropped pants.

It is possible to basically determine the type of the pants by the determination in S702, but in a case where the pants are not directed towards the front side, but are inclined, the maximum width Cw is calculated shorter than the original width, and as a result thereof, there is a case where erroneous determination is performed according to a photographed image. Therefore, in order to prevent such erroneous determination, the following additional processing based on the skin color region, is performed.

In S703, the height Hl of the skin color region in an image to be determined, is calculated. For example, as described in Type Determination Processing 1, the rectangular region surrounding the skin color region, may be set, and the height of the rectangular region may be calculated. Then, a correction ratio Rcc=Hl/Cl of the height Hl of the skin color portion to the length Cl of the clothing, is calculated. That is, in Type Determination Processing 3, the ratio used in the clothing type determination of Type Determination Processing 2, is used for correction. Furthermore, the height of the skin color region is calculated by excluding the portion corresponding to the top of the foot, as with Type Determination Processings 1 and 2, and thus, it is possible to further increase the determination accuracy.

Subsequently, in S704, a range in which the correction ratio Rcc can be obtained according to the length of the pants, is set, and to which of the ranges, the correction ratio calculated in S703, belongs, is determined. For example, a range of the long pants is set to Rcl, a range of the capri pants is set to Rcm, and a range of the cropped pants is set to Rcs, and thus, in the case of Rcc∈Rcl, the pants can be set to the long pants, in the case of Rcc∈Rcm, the pants can be set to the capri pants, and in the case of Rcc∈Rcs, the pants can be set to the cropped pants. Rcl, Rcm, and Rcs may be identical to Rl2, Rm2, and Rs2, respectively. The determination result is compared with a determination result in S702, and in a case where both of the determination results are not coincident with each other, the determination result in S702 is corrected on the basis of a determination result of the correction ratio Rcc.

Here, correction of "long"→"short" can be two-step correction of "long pants"→"cropped pants", and correction of "short"→"long" is only one-step correction of "capri pants"→"long pants" or "cropped pants"→"capri pants". This is because there are many cases where the clothing which is originally short, is determined as being long, according to the reflected state, but there are few cases where short clothing is determined as long clothing.

Type Determination Processing 4

It is possible to perform determination by combining Type Determination Processings 1 to 3 described above. For example, according to Type Determination Processings 1 and 2, the half pants and the short pants are determined and excluded, and then, three steps of the long pants, the capri pants, and the cropped pants, may be determined by any one of or a combination of Type Determination Processings 1 to 3. For example, in a case where the size of the lower region of the hem is greater than or equal to a prescribed threshold value Ths, the determination may be performed by Type Determination Processing 1 or 2, and in a case where the size is less than Ths, the condition of Type Determination Processing 3 may be added. In addition, in a case where the determination is performed by using a combination of Type Determination Processings 1 to 3, in order to correct erroneous determination of one determination result, the other determination result may be used.

Further, the direction of the feet (a direction towards which the tiptoes are directed) may be detected, and a preferential method may be selected on the basis of the detected angle, as a using method of the determination results of Type Determination Processings 1 to 3. For example, in a case where the feet are directed towards the front side, the determination result of Type Determination Processing 3 has priority, and in a case where the feet are directed towards a direction displaced from the front side, the determination result of Type Determination Processing 1 or 2 is capable of having priority. In a case where the feet are directed towards the front side, a high possibility that a determination result based on the data of the pants themselves is used as it is, whereas in a case where the feet are directed towards the lateral side, the value of the width is less than the actual value, and thus, it is possible to perform the determination, on the basis of the lower region of the hem of Type Determination Processing 1 or 2.

There is a method in which the edge of the shoes is detected, and the direction towards which the feet are directed, is specified from the direction towards which the tiptoes are directed, a displacement amount between a tiptoe position and the axis of the foot, and the direction of the outline of a boundary portion between the shoes and a skin color (an edge direction in the portion of the top of the foot). Even in the case of being directed towards the front side, there is a tendency that only one foot is tilted or bent, as the characteristics of the standing state of the subject, and thus, it may be determined that the body is directed towards the front side, insofar as only one foot is directed towards the front side.

According to the embodiment described above, it is possible to specify the shape of the pants as the clothing, on the basis of the information included in the image to be processed. At this time, it is possible to specify the shape of the pants, according to the size and the height (the length) of the skin color region positioned under the hem of the pants. In particular, the determination is performed by excluding the portion corresponding to the top of the foot from the skin color region, and thus, it is possible to specify the shape of the pants, regardless of the type of shoes worn by the subject, the direction towards which the subject is directed, or the posture of the subject.

In addition, in a case where the determination is performed on the basis of the shape of the pants themselves, the width of the waistline is reflected narrower than the original width, according to a photographing angle, whereas the length of the pants is not affected by the photographing angle. Accordingly, even in the case of the same pants, there is a concern that it is determined that the shape of the pants is different according to the photographing angle, but it is possible to solve such a determination error by combining a plurality of determination methods, and by assuming the direction of the subject.

Embodiment 2

In Embodiment 1 described above, a case has been described in which the image processing method of determining the type of the clothing included in the image to be processed, is performed by a single device. In contrast, in this embodiment, a case will be described in which a server determines the type of clothing included in an image generated by a client in a client-server system, and notifies the result to the client. In particular, a system including a server managing an online shopping site, will be described.

It is general that information relevant to the type of the clothing, is registered along with performing product registration with respect to the online shopping site, but the input may be omitted. In addition, in a case where a plurality of different types of products with the same fabric (clothing fabric) (in the case of the pants, the long pants, the capri pants, and the cropped pants) are provided, product information is applied only to the representative product even in a case where an image corresponding to each of the types is provided, and the applied product information is diverted to the other products. In this case, in a picture of the long pants, "long pants" is applied as a type, and in a picture of the capri pants or the cropped pants, the information of "long pants" is diverted, without independently applying the type. Further, in a case where a determination standard of classifying the type of the clothing is different according to a registrant, there is a concern that a variation occurs in the classification, in the online shopping site.

In such cases, even in a case where the image of the capri pants is searched, information of the type of "capri pants" is not applied to the image, and thus, is leaked from the search, or even though "long pants" is searched, the cropped pants or the capri pants slips into the search. As a result thereof, even though the user searches a product on the basis of the type of the clothing, it is not possible to smoothly find out the product that the user wants, and the user accesses a plurality of pages or searches the product a plurality of times, until the user finds out the product, and as a result thereof, a traffic increases, and a load on the server of the online shopping site increases.

Therefore, in this embodiment, when the product is registered in the online shopping site, clothing type determination processing of this embodiment is executed, and thus, the type of the clothing can be determined by a unified image processing method, at the time of the product registration, and can be registered in the server, in association with the image. Accordingly, it is possible to provide a unified classification of the types of the clothing by excluding a case where there is a difference in the presence or absence of the information of the type for each product, or a case where there is a variation in the classification due to a difference in the determination standard according to each of the registrants. Accordingly, it is possible to prevent confusion due to a variation in a display when the user searches the product.

System Configuration

Figure 8:
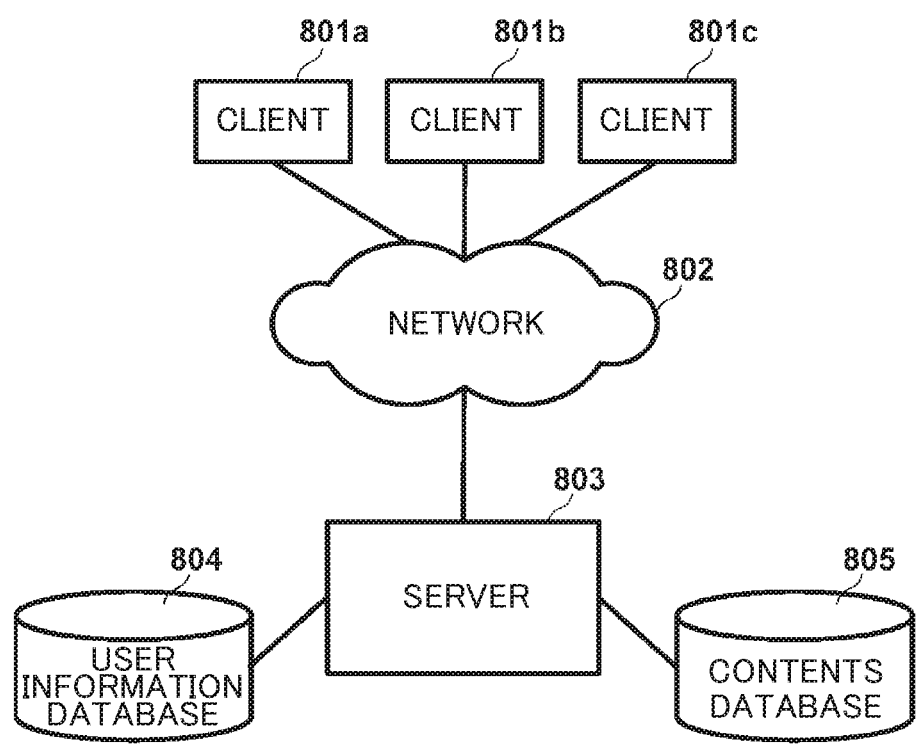
FIG. 8 is a diagram illustrating a configuration example of the entire client-server system, corresponding to the embodiment of the present invention.

Hereinafter, the configuration of the client-server system corresponding to this embodiment will be described. FIG. 8 is a block diagram illustrating an example of the configuration of the entire system corresponding to this embodiment, in a case where the systems is constructed as the online shopping site. The system is configured by connecting the user terminal and the server to a network. The server manages the online shopping site, and manages each user information item of a store and a customer, in addition to image information of a product to be sold in the site.

Clients 801*a*, 801*b*, and 801*c* (hereinafter, collectively referred to as a "client 801") are a user terminal which is operated by the user, and receives user authentication by the server, and then, is capable of receiving a service provided from the server. In this embodiment, the service is largely set to a branch store of the store in the online shopping site, and more specifically, includes a specific service of the type of the clothing relevant to a clothing image at the time of registering the product to be sold in the store.

A server 803 is a device which authenticates the user of the client 801, and provides the service with respect to the client 801 used by the authenticated user. The client 801 and the server 803 are respectively connected to a network 802, and are capable of communicating with each other. For example, the network 802 can be constructed as the Internet, a local area network (LAN), or a wide area network (WAN). The Internet is a network in which networks in the world are connected to each other, but the network 802 may be a network in which networks only in a specific organization can be connected to each other, such as an intranet. A user information database 804 and a contents database 805 are connected to the server 803.

The client 801 is operated by the user, and thus, is capable of using the service provided by the server 803. As described above, the service includes providing image processing of specifying the type of the clothing included in the photographed image. The client 801 is a user terminal, an information processing device, or a communication device, for example, includes a laptop computer, a desktop computer, a personal digital assistance, a mobile phone, a smart phone, a tablet terminal, and the like. The client 801 is provided with a camera for generating an image by photographing a subject. The client 801 is connected to the network 802 by wireless data communication means such as a wireless LAN and LTE. Furthermore, the client 801 may be configured such that access to the network 802 can be performed by a LAN including a network cable such as the Ethernet (Registered Trademark).

The server 803 manages the user information database 804, retains registration information of each user of the client 801, and in a case where each of the users receives the service, it is possible to determine whether or not the user has authority for receiving the service. In addition, the server 803 may manage data stored in the contents database 805, and may update the data on the basis of the information transmitted from the client 801. The server 803, for example, is connected to the user information database 804 or the contents database 805 through the LAN. The user information database 804 and the contents database 805 are respectively an information processing device in which prescribed database software is installed, and manage various data items.

The user information database 804 manages the registration information of each of the users. Specifically, the user information database 804 stores a user identifier for uniquely identifying the user (a user ID), user registration information for determining whether or not the user is a registered user (for example, setting a user name and a password, or the like), and the like, in association with each other.

The contents database 805 manages contents data provided to the client 801 from the server 803. In addition, the contents database 805 stores and manages the contents uploaded by the client 801. The contents data includes data such as a text, an image, a moving image, and a sound. Here, the image also includes an image in which the type of the clothing is determined by the processing of determining the type of the clothing corresponding to this embodiment. In the image, type information of the clothing is stored by being associated, as the attribution. In the contents data, a contents ID for uniquely identifying the contents data is allocated.

Furthermore, herein, for the sake of convenience, it has been described that the server 803, the user information database 804, and the contents database 805 are respectively realized by a physically independent information processing device, but the embodiments of the present invention are not limited thereto. For example, the server 803, the user information database 804, and the contents database 805 may be realized by a single information processing device. On the other hand, each of the devices such as the server 803 may has a redundant configuration or a dispersion configuration by a plurality of information processing devices. In addition, it has been described that the user information database 804 is connected to the server 803 through the LAN or the like, and for example, may be configured to communicate with the server 803 through the network 802 or an intranet (not illustrated). The same applies to a relationship between the server 803 and the contents database 805. In addition, the user information managed by the user information database 804, and contents associated data managed by the contents database 805 may be integrally managed.

Figure 9:
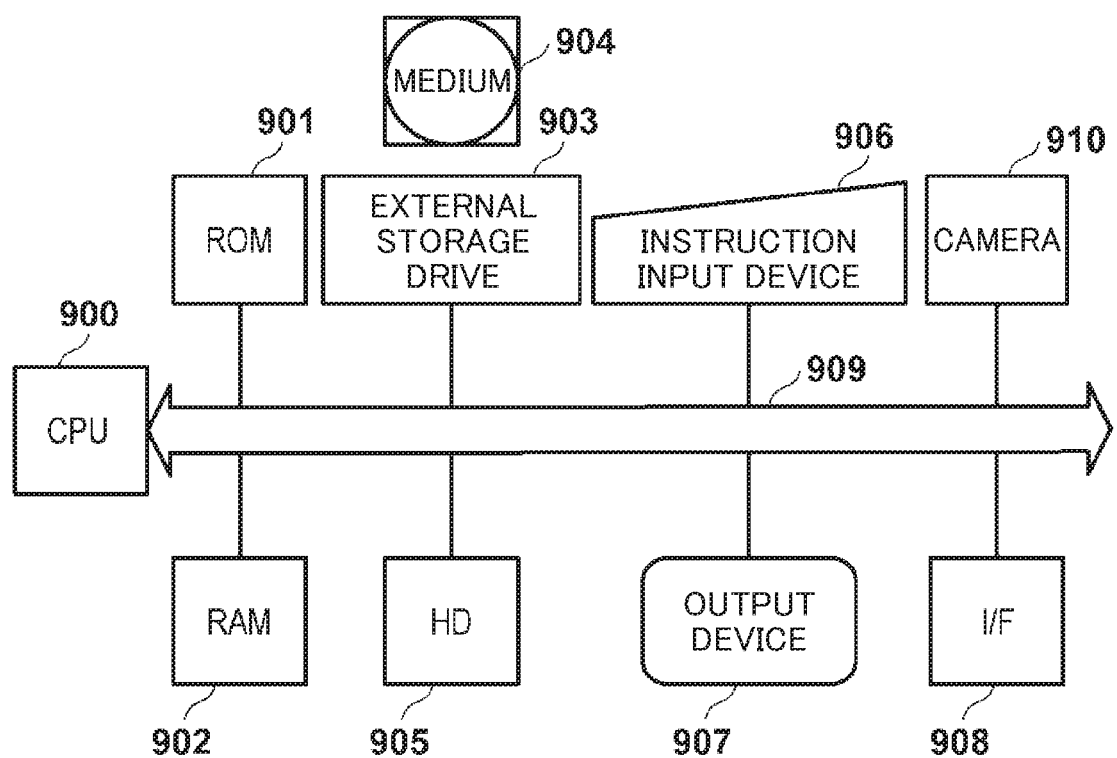
FIG. 9 is a block diagram illustrating an example of a hardware configuration of a client 801, corresponding to the embodiment of the present invention.

FIG. 9 is a block diagram illustrating an example of a hardware configuration of the client 801. The user information database 804 and the contents database 805 as the information processing device described above, may be configured as a similar or equivalent hardware configuration. Functions and applications, and relationships of a CPU 900, a ROM 901, a RAM 902, an external storage drive 903, a medium 904, an HD 905, an instruction input device 906, an output device 907, an I/F 908, and a system bus 909 are similar or equivalent to those described with respect to the constituents with the same names by using FIG. 1.

Here, in this embodiment, the client 801 further includes a camera 910, in addition to the configuration of FIG. 1. The camera 910 is capable of including a photographing optical system, an imaging element (a CMOS sensor or the like), an A/D conversion unit, and the like. An image signal output from the camera 910, may be stored in the RAM 902, and for example, may be converted into a JPEG image according to compression and encoding processing of the CPU 900, and may be stored in the medium 904 or the HD 905.

A hardware configuration of the server 803 is identical to that illustrated in FIG. 1, and thus, here, the description thereof will be omitted. Furthermore, the database 110 corresponds to the user information database 804 and the contents database 805.

Clothing Type Determination Processing in System

Hereinafter, in the client-server system illustrated in FIG. 8, the operation of each of the devices in a case where the clothing type determination processing is executed, will be described in detail.

In a case where the client 801 requests the registration of a product to be sent to the store, to the server 803, a webpage for registering a product image is transmitted from the server 803, as a flow of general processing corresponding to this embodiment. The webpage received by the client 801, is displayed on the display of the output device 807. The user of the client 801 photographs a picture of clothing to be subjected to the product registration, according to an instruction of the displayed webpage, transmits the picture to the server 803, and acquires the type information of the clothing, as a result of the determination processing executed on the server 803 side. The photographed image of the clothing and the type information can be uploaded to the server 803, in association with each other.

Figure 10:
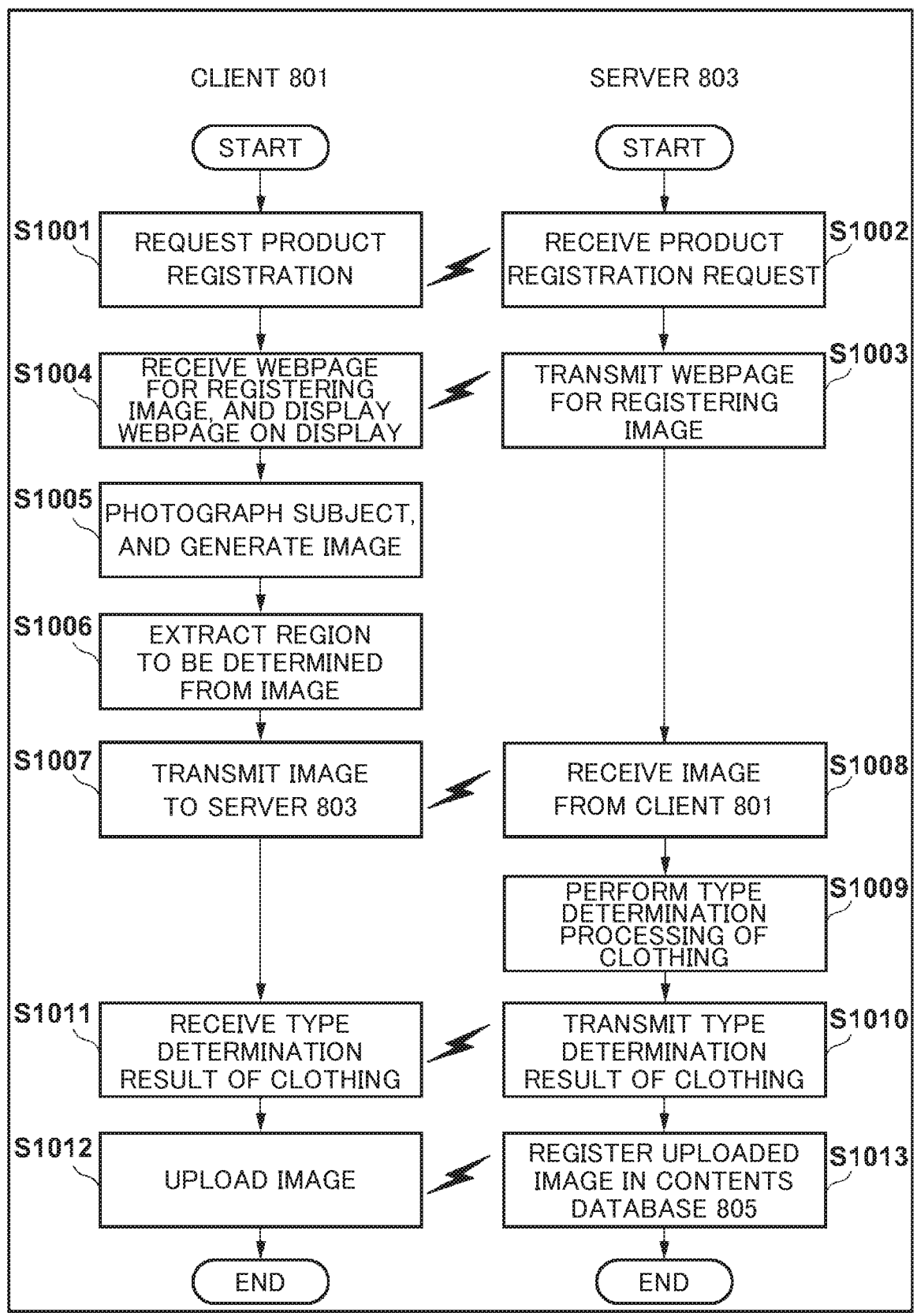
FIG. 10 is a flowchart illustrating an example of processing to be executed by a system corresponding to the embodiment of the present invention.

FIG. 10 illustrates an example of a flowchart of the processing to be executed between the client 801 and the server 803. The processing corresponding to the flowchart, for example, can be realized by allowing each of the CPUs of the client 801 and the server 803 to execute the corresponding program, and to control the operation of each of the functional blocks.

First, in S1001, the CPU 900 of the client 801 transmits a product registration request according to the operation from the user through the instruction input device 906, to the server 803 through the interface 908. In S1002, the CPU 100 of the server 803 detects that the product registration request transmitted from the client 801 received. Subsequently, in S1003, the CPU 100 on the server 803 side controls the interface 108, and transmits the information of the webpage for registering an image, to the client 801. The webpage includes information for uploading the photographed picture to the server.

In S1004, in a case where the client 801 receives the webpage for registering an image, through the interface 908, the CPU 900 displays the webpage on the display of the output device 907. Subsequently, in S1005, in the client 801, a subject (for example, the clothing worn by the model) is photographed by the camera 910, according to the operation from the user through the instruction input device 906, and thus, an image is generated.

In S1006, the CPU 900 extracts the region to be determined from the image photographed in S1005. At this time, the image may be displayed on the display, and may receive the designation of the region to be determined of the type of the clothing, through the instruction input device 906. Subsequently, in S1007, the CPU 900 transmits an image of the region extracted in S1006, to the server 803, through the interface 908. Furthermore, in the image transmission of S1006, not only the image of the region but also the entire image generated in S1003 may be transmitted to the server 803. In this case, information for designating the region can be transmitted by being attached to the transmitted image.

In S1008, the CPU 100 of the server 803 receives the image transmitted by the client 801 in S1007, through the interface 108. Subsequently, in S1009, the CPU 100 executes the type determination processing with respect to the received image. In S1009, the CPU 100 executes the processing corresponding to S203 to S205 of FIG. 2. When it is possible to specify the type of the clothing included in the received image, in S1010, the CPU 100 transmits a type determination result to the client 801, through the interface 108.

In S1011, the CPU 900 of the client 801 receives the type determination result transmitted by the server 803 in S1010, through the interface 908. Subsequently, in S1012, the CPU 900 controls the interface 908, and uploads the type determination result received in S1011, to the server 803, by associating the type determination result with the image photographed in S1005. In S1013, the CPU 100 of the server

803, receives the image uploaded from the client 801 in S1012, through the interface 108, and registers the image in the contents database 805.

Furthermore, in S1006, in a case where the entire image is transmitted in advance, in the processing of S1012, the image is not transmitted, but an image registration request based on the transmitted type determination result, can be transmitted. In this case, both of the image which is a registration target and the type determination result are on the server 803 side, and thus, only a request for performing registration in associated with each other, may be transmitted, on the client 801 side.

As described above, in a case where the image photographed by the client 801, is registered in the server 803, the registration can be performed by specifying in advance the information of the type, and then, by associating the information with the image. Accordingly, when the product image is registered in the online shopping site, the registration can be performed after the type is specified. At this time, it is possible to specify the type by only the image without confirming the product itself, and thus, it is possible to complete the processing by only the image at the time of registering a volume of clothing in the site, and to reduce a burden on the user. In addition, an arithmetic operation load is low in the type determination processing corresponding to this embodiment, and thus, even in a case where the determination is performed on the server 803 side, a processing load on the server side does not increase.

In addition, according to this embodiment, it is possible to apply the information of the type of the shape of the pants (long, middle, and short) in image unit, and thus, in a case where the product image registered in the contents database 805 is a search target, it is possible to search the pants with a favorite shape, in the image unit but not in product unit. As described above, in search in registration product page unit, in a case where only the tag of "long pants" is registered, there is a case where it is not possible to find out "capri pants" of the same pattern and material, but as with this embodiment, the information of the type is applied in the image unit, and thus, it is possible to find out a product page of the pants with a middle length, from a link associated with an image hit by image search.

Other Embodiments

The present invention is not limited to the embodiments described above, and various modifications and variations can be performed without departing from the spirit and scope of the present invention. Accordingly, in order to publicize the scope of the present invention, the following claims are attached. In addition, the information processing device according to the present invention, can be realized by a computer program for allowing one or more computers to function as the information processing device. The computer program can be provided/distributed by being recorded in a computer-readable recording medium, or through an electrical communication line.

The invention claimed is:

1. An image processing device, comprising:
at least one memory configured to store computer program code;
at least one processor configured to access the computer program code and operate as instructed by the computer program code, the computer program code including:
acquisition code configured to cause at least one of the at least one processor to acquire an image to be processed including an image of clothing worn by a subject on a lower body;
specifying code configured to cause at least one of the at least one processor to specify a position of an end portion of the clothing, in the image to be processed;
extraction code configured to cause at least one of the at least one processor to extract a connected region which is positioned to be adjacent to the end portion of the clothing and is configured by connecting prescribed pixels, from the image to be processed; and
determination code configured to cause at least one of the at least one processor to:
recognize a presence of pants represented above the connected region,
identify a first foot and a second foot of the subject below the connected region,
determine that the first foot and/or the second foot is pointed forward in the image, and
determine a type of the pants based on a ratio (Rc) between a maximum width (Cw) and a length (Cl) of the pants.

2. An image processing device, comprising:
at least one memory configured to store computer program code;
at least one processor configured to access the computer program code and operate as instructed by the computer program code, the computer program code including:
acquisition code configured to cause at least one of the at least one processor to acquire an image to be processed including an image of clothing worn by a subject on a lower body;
specifying code configured to cause at least one of the at least one processor to specify a position of an end portion of the clothing, in the image to be processed;
extraction code configured to cause at least one of the at least one processor to extract a connected region which is positioned to be adjacent to the end portion of the clothing and is configured by connecting prescribed pixels, from the image to be processed; and
determination code configured to cause at least one of the at least one processor to determine a type of the clothing, on the basis of the connected region,
wherein the end portion of the clothing is a hem of the clothing, and the prescribed pixel is a skin color pixel,
wherein the extraction code is configured to cause at least one of the at least one processor to detect a convex portion in an outline of a region in which the skin color pixels are connected, and
the connected region is set by excluding a region positioned on a lower side from the convex portion.

3. An image processing device, comprising:
at least one memory configured to store computer program code;
at least one processor configured to access the computer program code and operate as instructed by the computer program code, the computer program code including:
acquisition code configured to cause at least one of the at least one processor to acquire an image to be processed including an image of clothing worn by a subject on a lower body;

specifying code configured to cause at least one of the at least one processor to specify a position of an end portion of the clothing, in the image to be processed;

extraction code configured to cause at least one of the at least one processor to extract a connected region which is positioned to be adjacent to the end portion of the clothing and is configured by connecting prescribed pixels, from the image to be processed; and determination code configured to cause at least one of the at least one processor to determine a type of the clothing, on the basis of the connected region, wherein the determination code is configured to cause at least one of the at least one processor to set a rectangular region surrounding the connected region, and determine the type of the clothing, on the basis of an aspect ratio of the rectangular region.

4. The image processing device according to claim 3, wherein the type of the clothing includes at least a plurality of types, and the determination code is configured to cause at least one of the at least one processor to determine the type, on the basis of which of the ranges set with respect to each of the plurality of types, the aspect ratio belongs to.

5. The image processing device according to claim 3, wherein the specifying code is configured to cause at least one of the at least one processor to further specify a length of the clothing based on the position of the end portion of the clothing, and the determination code is configured to cause at least one of the at least one processor to set a rectangular region surrounding the connected region, and determine the type, on the basis of a ratio between a height of the rectangular region and the length of the clothing.

6. The image processing device according to claim 1, wherein the specifying code is configured to cause at least one of the at least one processor to further specify a maximum width of the clothing, and a length of the clothing, and the determination code is configured to cause at least one of the at least one processor to determine the type, on the basis of a ratio between the maximum width and the length, by setting a rectangular region surrounding the connected region, and by correcting the determined type, on the basis of an aspect ratio of the rectangular region.

7. The image processing device according to claim 6, wherein in a case where the type determined on the basis of the ratio is not coincident with the type determined on the basis of the aspect ratio, the determination code is configured to cause at least one of the at least one processor to correct the type of the clothing to the type determined on the basis of the aspect ratio.

8. The image processing device according to claim 7, wherein the type of the clothing includes at least a plurality of types, and in a case where the clothing is pants, the plurality of types include at least a first type, a second type, and a third type, in the order of a length of the pants, and the determination code is configured to cause at least one of the at least one processor to set the type of the clothing, to the second type or the third type in a case where the type is changed from the first type, to the first type or the third type in a case where the type is changed from the second type, and to only the second type in a case where the type is changed from the third type.

9. The image processing device according to claim 1, further including a photographing means for photographing the clothing to generate the image to be processed.

10. The image processing device according to claim 1, further including a communication circuit configured to receive the image to be processed from an external device.

11. The image processing device according to claim 10, wherein the communication circuit transmits a determination result of the type of the clothing, to the external device.

12. A server managing product information in an online store, the server comprising:

at least one memory configured to store computer program code;

at least one processor configured to access said computer program code and operate as instructed by said computer program code, said computer program code including:

reception code configured to cause at least one of the at least one processor to receive an image to be processed including an image in which a subject wears clothing on a lower body, from a client, in a case where a product registration request of the clothing worn on the lower body is received from the client performing product registration in the online store;

specifying code configured to cause at least one of the at least one processor to specify a position of an end portion of the clothing, in the image to be processed;

extraction code configured to cause at least one of the at least one processor to extract a connected region which is positioned to be adjacent to the end portion of the clothing and is configured by connecting prescribed pixels, from the image to be processed; and determination code configured to cause at least one of the at least one processor to determine a type of the clothing, on the basis of the connected region, wherein the determination code is configured to cause at least one of the at least one processor to set a rectangular region surrounding the connected region, and determine the type of the clothing, on the basis of an aspect ratio of the rectangular region.

13. The server according to claim 12, wherein the reception code is configured to cause at least one of the at least one processor to register the image to be processed and the determination result in association with each other, in a database, in a case where a registration request of the image to be processed, based on the notified determination result, is received from the client.

* * * * *